US012662240B2

(12) United States Patent (10) Patent No.: US 12,662,240 B2

Van-Thiel (45) Date of Patent: Jun. 23, 2026

(54) BUOYANCY SYSTEM FOR AN AIRCRAFT COMPRISING ROLL STABILIZATION MEANS

(71) Applicant: SAFRAN AEROSYSTEMS, Plaisir (FR)

(72) Inventor: Eric Van-Thiel, Moissy-Cramayel (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 0 days.

(21) Appl. No.: 19/164,179

(22) PCT Filed: Mar. 13, 2024

(86) PCT No.: PCT/FR2024/050301

§ 371 (c)(1),
(2) Date: Sep. 10, 2025

(87) PCT Pub. No.: WO2024/194553

PCT Pub. Date: Sep. 26, 2024

(65) Prior Publication Data

US 2026/0116533 A1 Apr. 30, 2026

(30) Foreign Application Priority Data

Mar. 17, 2023 (FR) ...................................... 2302524

(51) Int. Cl.
B64C 25/56 (2006.01)
B64C 27/06 (2006.01)

(52) U.S. Cl.
CPC .............. B64C 25/56 (2013.01); B64C 27/06 (2013.01)

(58) Field of Classification Search
CPC . B64C 25/56; B64C 2025/325; B64C 27/006; B64C 27/06
See application file for complete search history.

(56) References Cited

U.S. PATENT DOCUMENTS

| | | | | | |
|---|---|---|---|---|---|
| 3,240,449 | A | * | 3/1966 | Robinson, Jr. .......... | B64C 25/56 |
| | | | | | 244/105 |
| 7,309,267 | B1 | * | 12/2007 | Henry ..................... | B64C 25/56 |
| | | | | | 441/40 |
| 2015/0360758 | A1 | * | 12/2015 | Rivault ................... | B63B 43/04 |
| | | | | | 114/360 |
| 2018/0305040 | A1 | * | 10/2018 | Poster ..................... | B64C 27/06 |

OTHER PUBLICATIONS

International Application No. PCT/FR2024/050301, International Search Report and Written Opinion, May 21, 2024, 16 pages (5 pages of English translation, 11 pages of original document).

* cited by examiner

*Primary Examiner* — Tye William Abell

(74) *Attorney, Agent, or Firm* — Kilpatrick Townsend & Stockton LLP

(57) ABSTRACT

The invention relates to a buoyancy system, intended to be connected to a structure of an aircraft comprising roll stabilization means comprising at least one floating mat, intended to be deployed on a water surface to reduce a rolling motion of the aircraft.

8 Claims, 2 Drawing Sheets

BUOYANCY SYSTEM FOR AN AIRCRAFT COMPRISING ROLL STABILIZATION MEANS

CROSS REFERENCE TO RELATED APPLICATIONS

This application is a U.S. national phase under 35 U.S.C. § 371 of International Patent Application No. PCT/FR2024/050301, filed on Mar. 13, 2024, which claims priority to French Patent Application No. 2302524, filed on Mar. 17, 2023, the entire contents of both of which are incorporated herein by reference in their entireties.

TECHNICAL FIELD

The invention relates to the technical field of buoyancy systems for water landing and stability in flotation of a transport device, in particular an aircraft, and more particularly a rotary-wing aircraft, such as a helicopter.

PRIOR ART

Any aircraft intended to transport people in maritime zones must be equipped with a buoyancy system making it possible, in the event of emergency water landing, to ensure sufficient buoyancy to allow evacuation of the people from the aircraft.

Certification regulations specify that an aircraft must be able to land and be stable on water with such a buoyancy system. Aircraft stability must be demonstrated for free water surface states that are defined in the certification regulations via parameters such as a wave height and period.

Free water surface states, also known as "sea conditions", apply to any liquid surface. The term "water landing" also covers the case of an aircraft setting down, in particular in a controlled manner, on any free water surface, whether on a sea, ocean or lake for example.

An update in the normative context has resulted in a more stringent requirement level for certain checks. Thus, the standards CS27 and CS 29 Amendment 5 require a stability check against an irregular swell. Previously, it was simply necessary to check stability against a regular swell.

By following current standards, existing buoyancy systems are at a risk of having lower certification levels than those obtained under older standards.

DESCRIPTION OF THE INVENTION

In view of the foregoing, the aim of the invention is that of improving aircraft stability in the event of water landing.

The present invention relates to a buoyancy system, intended to be connected to an aircraft structure and capable of ensuring the buoyancy of the aircraft on a water surface, comprising roll stabilization means comprising at least one floating mat, intended to be deployed on a water surface to reduce a rolling motion of the aircraft.

The presence of the floating mat has the effect of stabilizing the aircraft against rolling of the aircraft. The buoyancy system provided makes it possible to considerably increase mechanical work required to overturn the aircraft.

According to the invention, the floating mat is capable of being connected to the aircraft structure directly and/or indirectly, particularly via the float.

More particularly, the floating mat is associated with at least one float of the buoyancy system, particularly at least one inflatable float.

Furthermore, the buoyancy system can comprise a deployment device capable of allowing the deployment of elements integrated in the buoyancy system in the event of water landing.

Furthermore, the floating mat can be disposed on a distal side of the float.

Moreover, the floating mat can have a flexibility so as to allow the floating mat to follow a shape of the water surface.

The floating mat can be provided with drag means, intended to allow an increase in a drag force relative to the water.

According to an additional feature, the means for increasing drag comprise at least one water pocket and/or a floating anchor.

According to another additional and/or complementary feature, the stabilization means comprise at least one inflatable raft and wherein the floating mat is at least one constituent element of the raft.

According to another aspect, the invention relates to an aircraft equipped with a buoyancy system as described above.

BRIEF DESCRIPTION OF THE DRAWINGS

Other aims, features and advantages of the invention will appear upon reading the following description, given only as a non-limiting example, and made with reference to the appended drawings wherein.

DETAILED DESCRIPTION OF AT LEAST ONE EMBODIMENT

It should be noted that, in the figures, common structural and/or functional elements to the different embodiments may have the same references. Thus, unless specified otherwise, such elements have identical structural, dimensional and material properties.

Figure 1:
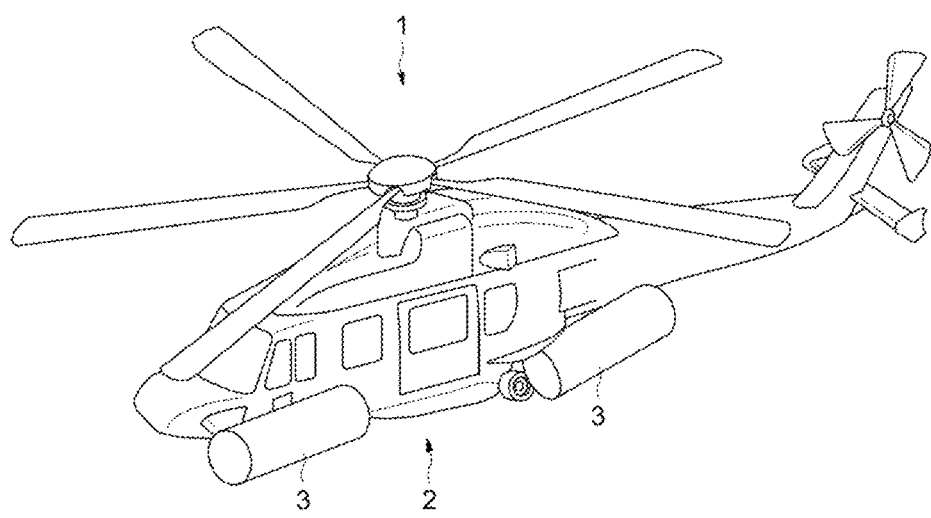
FIG. 1 is a perspective view of an aircraft according to the invention.

FIG. 1 shows a perspective view of an aircraft 1 according to the invention.

The aircraft 1 is provided with a buoyancy system 2 according to the invention in order to be able to float on the water in the event of water landing.

Such a buoyancy system 2 is provided with at least one float 3, particularly with at least two floats 3, particularly arranged on either side of a fuselage of the aircraft 1.

In particular, the floats 3 can be paired. Therefore, the floats 3 of a matching pair can be arranged symmetrically on either side of an anterior-posterior plane of symmetry of the aircraft 1.

The buoyancy system 2 can also comprise a deployment device (not shown), capable of allowing the deployment of elements integrated in the buoyancy system 2.

The deployment device can comprise an inflation means, capable of inflating inflatable elements of the buoyancy system 2. The inflation means can, for example, be of chemical or electrical nature. For this purpose, the float 3 can be an inflatable float.

Outside a water landing phase, the float 3 can be folded in a compartment of the aircraft 1. During the water landing phase, the float 3 is deployed, for example inflated, by the deployment device of the buoyancy system 2.

The float 3 is capable of being inflated in flight prior to the water landing, or after the water landing.

Figure 2:
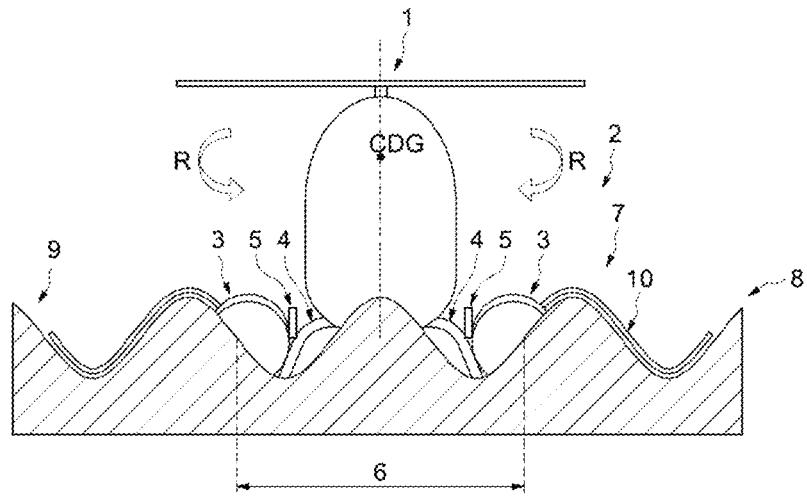
FIG. 2 is a schematic front view of an aircraft equipped with a buoyancy system according to the invention.

FIG. 2 is a schematic front view of the aircraft 1 equipped with the buoyancy system 2 according to the invention. In particular, the aircraft 1 is equipped with at least one float 3, particularly with at least two floats 3 arranged on either side of the fuselage of the aircraft 1.

The buoyancy system 2, in particular the float 3, is connected to a structure 4 of the aircraft 1 by a connecting device 5.

In the event of water landing on a rough sea, the aircraft 1 can tilt by having a roll angle, corresponding to an angle between a vertical direction and the anterior-posterior plane of symmetry of the aircraft 1.

As long as the roll angle is less than a certain threshold, the aircraft 1 is not likely to be overturned.

The aircraft 1 can particularly be overturned when the center of gravity CDG of the aircraft no longer hangs over a flotation space 6, particularly between two floats 3 disposed on either side of the fuselage of the aircraft 1.

To reduce the risk of the aircraft 1 being overturned, the buoyancy system 2 comprises stabilization means 7 against a rolling motion R of the aircraft 1.

The rolling motion R of the aircraft 1 can, for example, be caused by waves from a swell 8 formed on a water surface 9 on which the aircraft 1 is set down.

According to one embodiment, the stabilization means 7 comprise at least one floating mat 10.

The floating mat 10 is intended to be deployed on the water surface 9 in the event of water landing. The deployment of the floating mat 10 is either controlled, or triggered automatically, particularly by submergence detection. When the deployment of the floating mat 10 is controlled, it is carried out, preferably, after the water landing. It remains nonetheless possible to deploy the floating mat 10 before the water landing. Similarly, when the deployment of the floating mat 10 is triggered automatically, it is carried out, in particular, after the water landing.

The floating mat 10 is made of a material of a lower density than water, such as for example plastic or textile.

The floating mat 10 is connected to the aircraft structure 4 either directly or indirectly, particularly via the float 3.

In the embodiment illustrated in FIG. 2, the buoyancy system 2 comprises at least two floats 3 arranged on either side of the fuselage of the aircraft 1. Preferably, the buoyancy system 2 comprises as many floating mats 10 as floats 3.

Thus, more particularly, the floating mat 10 is associated with the float 3. In particular, the floating mat 10 is disposed on a distal side of the associated float 3.

In such an embodiment, the floating mat 10 is indirectly connected to the structure 4 of the aircraft 1 via the floats 3.

In various embodiments, the floating mat 10 can be tied, sewn, and/or glued to the float 3. It is also possible that a floating belt 10 and an associated float 3 form a one-piece body.

The purpose of the floating belt 10 is that of reducing the rolling motion R of the aircraft 1. The presence of the floating mat 10 on the water surface 9 makes it possible to create stabilizing forces opposing the rolling motion R when the floating mat 10 moves on the water surface 9.

The floating mat 10 helps create a stabilizing effect. The stabilizing effect is particularly due to a drag force and the forces generated by a surface tension between the water surface 9 and the floating mat 10.

Figure 3:
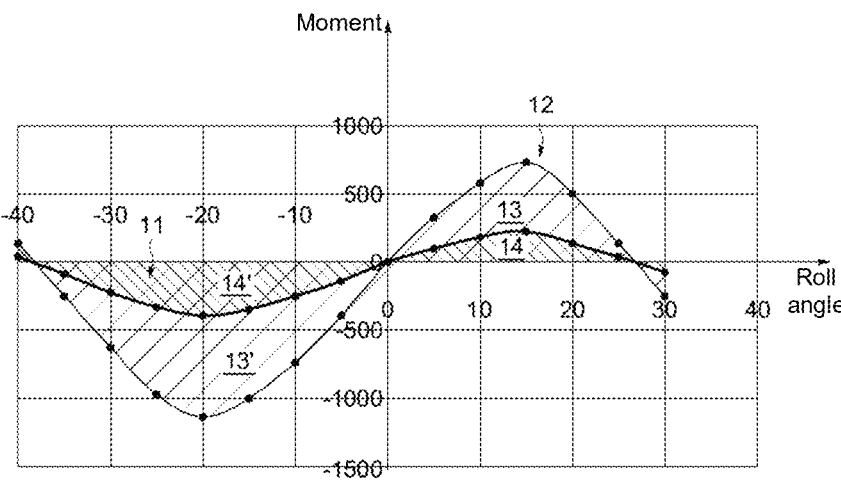
FIG. 3 is a graph showing the stabilizing effect against rolling motion according to the invention.

FIG. 3 illustrates a graph showing the stabilizing effect against the rolling motion R according to the invention. The stabilizing effect is due to the presence of the floating mat 10.

In the graph of FIG. 3, a roll angle is represented on the x-axis. The roll angle is obtained under a stress of a moment represented on the y-axis.

The origin of the graph in FIG. 3 corresponds to the zero roll angle and zero stressing moment.

More specifically, the graph of FIG. 3 shows:
a first curve 11 showing an evolution of the roll angle R in a configuration not comprising floating mats 10; and
a second curve 12 showing an evolution of the roll angle R in a configuration comprising at least one floating mat 10.

The stabilizing effect of the floating mat 10, in particular of the floating mats 10, is demonstrated by higher values of the stressing moment in absolute values of the second curve 12 compared to the corresponding values of the first curve 11.

Thus, at the same roll angle R, it is necessary to provide a higher stressing moment in the presence of floating mats 10.

The stabilizing effect of the floating mat 10 is obvious when considering mechanical work required to overturn the aircraft 1. The mechanical work required to overturn the aircraft 1 corresponds to the area between the first curve 11 and the second curve 12 and the x-axis, from the origin and up to the overturning angle.

For example, the areas 13 and 13' under the second curve 12 are respectively significantly greater than the areas 14 and 14' under the first curve 11. Thus, the presence of floating mats 10 makes it possible to considerably increase the mechanical work required to overturn the aircraft 1.

The overturning angle corresponds to the intersection of the first curve 11 and the second curve 12 with the x-axis and represents a point of instability for the balance of the aircraft 1.

In FIG. 3, it is observed that the presence of floating mats 10 has no impact on the overturning angle. The latter corresponds to the same values for the first curve 11 and the second curve 12, namely, according to the example shown, about +27° in the positive part and −37° in the negative part.

To increase the stabilizing effect further, the floating mat 10 can be equipped with drag means, intended to allow an increase in a drag force relative to the water.

For example, the floating mat 10 can have inflatable shapes and/or portions to retain water and/or increase a drag coefficient, so as to increase a force required for a displacement of the floating mat 10 relative to the water.

In an embodiment not shown, the drag means comprise a floating anchor and/or at least one water pocket.

In order to maximize the forces generated by the surface tension, the floating mat 10 has a flexibility so as to allow the floating mat 10 to follow a shape of the water surface 9. Thus, the floating mat 10 is able to deform to mold the water surface 9.

In an embodiment not shown, the stabilization means 7 comprise at least one raft, particularly an inflatable raft. In such a configuration, the floating mat 10 as described above is capable of being at least one constituent element of the raft, in particular a bottom of the raft. Thus, the raft participates in the stabilizing effect against the rolling motion R of the aircraft 1. The floating mat 10 that is part of the bottom of the raft is detachable from the float 3 associated with it and/or from the aircraft 1.

In particular, the float 3, the floating mat 10 and/or the raft form(s) the elements integrated in the buoyancy system 2, capable of being deployed by the deployment device of the buoyancy system 2.

In the detailed presentation of the invention, the terms used should not be considered as limiting the invention to the embodiments disclosed, but should be interpreted to include any equivalents for which the provision is within the scope of a person skilled in the art by applying their general knowledge to the implementation of the teaching that has just been disclosed.

Of course, the invention is not limited to the embodiments described above and provided only by way of example. The different features, variants and/or embodiments of the present invention can be associated with each other according to various combinations insofar as they are not mutually incompatible or exclusive.

Furthermore, the invention encompasses various modifications, alternative forms and other variants that may be envisaged by a person skilled in the art within the scope disclosed.

The invention claimed is:

1. A buoyancy system to be connected to a structure of an aircraft, the buoyancy system comprising roll stabilization means comprising at least one floating mat to be deployed on a water surface to reduce a rolling motion of the aircraft;

wherein the floating mat has a flexibility so as to allow the floating mat to follow a shape of the water surface.

2. The buoyancy system according to claim 1, wherein the stabilization means comprise at least one inflatable raft and wherein the floating mat is at least one constituent element of the raft.

3. The buoyancy system according to claim 1, wherein the floating mat is associated with at least one float of the buoyancy system.

4. The buoyancy system according to claim 3, wherein the floating mat is disposed on a distal side of the float.

5. An aircraft equipped with a buoyancy system according to claim 1.

6. A buoyancy system to be connected to a structure of an aircraft, the buoyancy system comprising roll stabilization means comprising at least one floating mat to be deployed on a water surface to reduce a rolling motion of the aircraft;

wherein the floating mat is equipped with drag means intended to allow an increase in a drag force relative to the water.

7. The buoyancy system according to claim 6, wherein the drag means comprise at least one water pocket and/or a floating anchor.

8. An aircraft equipped with a buoyancy system according to claim 6.

* * * * *